United States Patent [19]

Shirley

[11] 3,912,192
[45] Oct. 14, 1975

[54] RESTRAINING DEVICE

[75] Inventor: Albert J. W. Shirley, Slough, England

[73] Assignee: M. L. Aviation Company Limited, Slough, England

[22] Filed: May 20, 1974

[21] Appl. No.: 471,831

[30] Foreign Application Priority Data

May 25, 1973 United Kingdom............... 25162/73

[52] U.S. Cl.............. 242/107.4; 74/577 R; 244/116
[51] Int. Cl.² ...................... B65H 75/34; B64F 1/12
[58] Field of Search............... 74/577 R, 577 S, 5.5; 242/107.4; 280/150 SB; 114/43.5; 244/115, 116

[56] References Cited
UNITED STATES PATENTS

| | | | |
|---|---|---|---|
| 2,667,078 | 1/1954 | Baecher................................. | 74/5.5 |
| 3,151,826 | 10/1964 | Michel................................ | 244/115 |
| 3,226,053 | 12/1965 | Petty................................. | 242/107.4 |
| 3,240,510 | 3/1966 | Spouge......................... | 242/107.4 X |
| 3,578,260 | 5/1971 | Kell................................. | 242/107.4 |
| 3,740,000 | 6/1973 | Takada............................ | 242/107.4 |

*Primary Examiner*—Scott, Samuel
*Assistant Examiner*—F. D. Shoemaker
*Attorney, Agent, or Firm*—Brisebois & Kruger

[57] ABSTRACT

A restraining device is designed for holding objects in position on the deck of a moving craft, particularly for holding aircraft in position on the deck of a ship. The device is of the type comprising a spring-loaded drum capable of turning in a mounting and carrying a strop or similar flexible member for connection to the object to be held, the unwinding of which is resisted by the spring. The improvement of the invention consists of a ratchet control mechanism including a ratchet wheel turning with the drum and acted on by a pawl controlled by a hydraulically damped pendulum so as to be moved into engagement with the ratchet teeth when the pendulum swings through more than a predetermined angle from the vertical. As long as the deck is substantially horizontal the aircraft or object will be held in position by means of strops from at least three of the restraining devices, but it will nevertheless be possible to move the aircraft as required by extending one or more of the strops against the effect of its spring and allowing the remaining strop or strops to be taken up under spring control. On the other hand, as soon as the deck of the craft tilts beyond the predetermined angle to the horizontal the pendulum will move the pawls into engagement with the ratchet teeth, preventing the drum from rotation and thus holding the aircraft firmly in position. A manually controlled pawl may also be provided so as to lock the drum against rotation even when the deck is horizontal.

4 Claims, 1 Drawing Figure

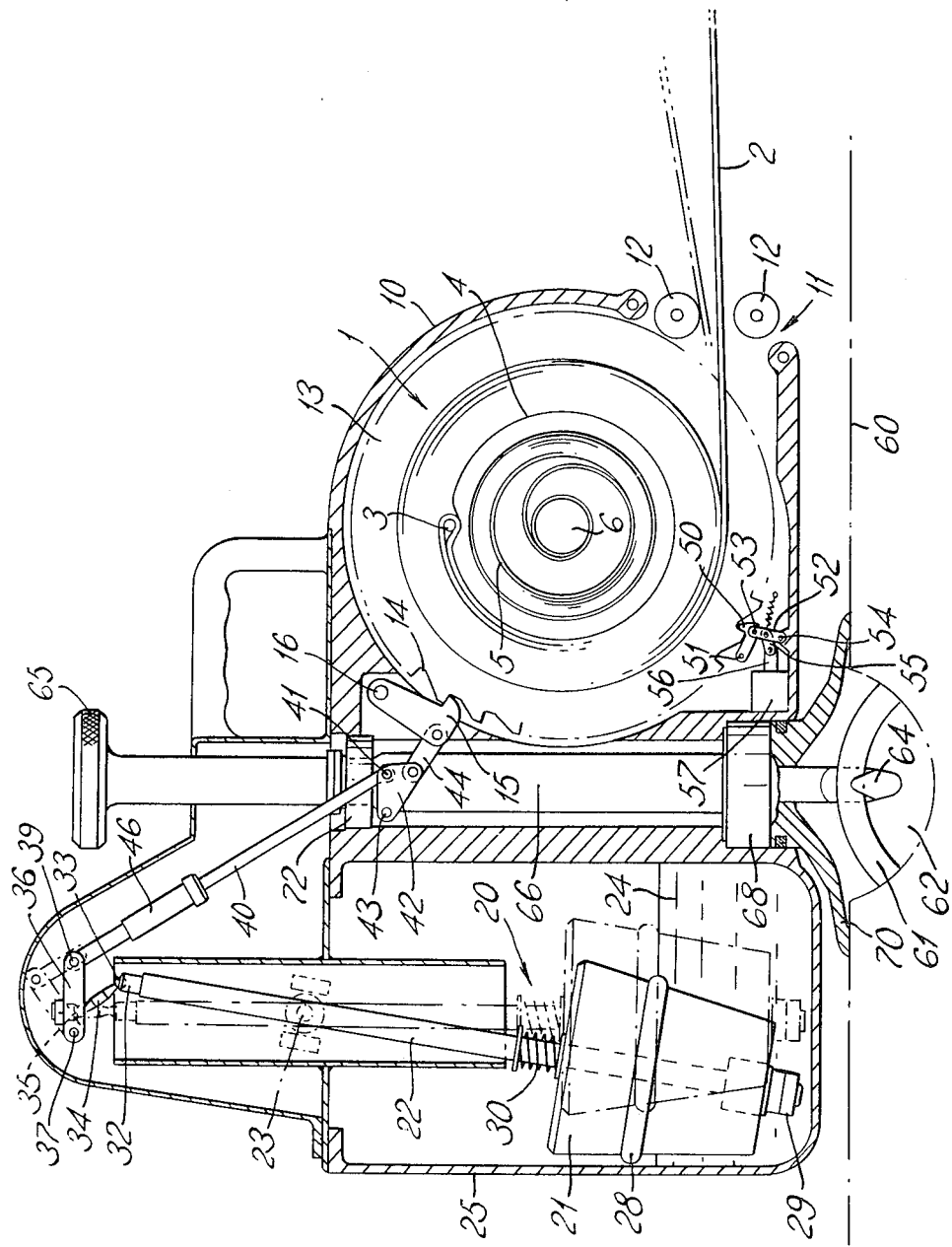

RESTRAINING DEVICE

This invention relates to devices for holding objects in position on the deck of a moving craft. One application for such a device is for holding aircraft and other equipment in position on the deck of a sea-borne craft in such a way that they are capable of being moved if required, but are nevertheless held firmly in position against the effect of the inclination of the deck, for example during rolling and turning movements of a sea-borne craft. Previously it has been necessary to lash such objects to the deck of the moving craft with the result that in order to move the object, the lashing must be unfastened, leaving the object free to slide out of control should the deck of the craft suddenly tilt at an angle to the horizontal.

According to the present invention a restraining device for the purpose just described comprises a spring-loaded drum capable of turning in a mounting and carrying a strop or similar flexible member for connection to the object to be held, the unwinding of which is resisted by the spring, and a ratchet control mechanism including a ratchet wheel turning with the drum and acted on by a pawl controlled by a hydraulically damped pendulum so as to be moved into engagement with the ratchet teeth when the pendulum swings through more than a predetermined angle from the vertical. In use the device is anchored in position, either directly to a strong point in the deck of the craft or, alternatively, to a rail section let in flush with the deck. Under normal conditions, i.e. when the deck is substantially horizontal, connection of the strop to the object to be held, in conjunction with similar strops from at least two other such devices, will hold the object steady since each strop will be under tension against the effect of its respective spring, but it will nevertheless be possible to move the object as required by extending one or more of the strops against the effect of its spring and allowing the remaining strop or strops to be taken up under spring control. Under these conditions, the pendulum of each device will hang substantially vertically so that the respective pawl is clear of its ratchet wheel and the ratchet wheel and associated drum is free to turn. On the other hand, as soon as the deck of the craft tilts at an angle to the horizontal, the pendulum will move the pawl into engagement with the ratchet teeth and so prevent the drum from rotating, thus holding the object firmly against the effects of the tilting. The device may conveniently be designed so that the pawl comes into operation when the deck tilts at an angle of from 5° to 8° to the horizontal. Damping of the pendulum prevents it from swinging back while the deck is still tilted and this maintains the pawl in engagement with the ratchet teeth.

The pendulum preferably includes a generally vertical rod which is suspended at a point close to its upper end by a universal joint so as to be capable of swinging in any direction, the upper end of the rod being connected to a linkage controlling the pawl so that movement of the upper end as a result of swinging of the pendulum moves the linkage so as to cause the pawl to engage the ratchet teeth. In a somewhat simpler form of construction, the pendulum rod is secured to the underside of a hemisphere having a flat upper side and supported in a circular opening in a plate. Swinging movement of the pendulum causes one side of the flat surface of the hemisphere to rise and this acts directly against an arm extending from the pawl, thus moving it directly into engagement with the ratchet teeth.

Under some circumstances it may be desirable to lock the drum against rotation even when the deck is horizontal and for this purpose a manually controlled pawl may be provided. In the simplest form of arrangement, the same pawl may be used as is controlled by the pendulum, an additional manual control being provided. Preferably, however, a separate locking pawl is included which may be operated by a solenoid under manual control.

A construction of restraining device in accordance with the invention will now be described in more detail, by way of example, with reference to the accompanying drawing which is a vertical section of the device shown fixed in position to a strong point in a deck.

The apparatus comprises a drum indicated generally as 1 on which is wound a length of webbing strop 2 for securing to an object to be held in position. The end of the strop is anchored at 3 to the hub 4 of the drum 1 which contains a spiral spring 5, the inner end of which is fixed to an axle 6 and which is wound up as a result of anticlockwise rotation of the drum 1 when the strop 2 is withdrawn. The drum 1 is enclosed within a housing 10 formed with an opening 11 within which are located a pair of rollers 12 for guiding the strop 2. One end cheek 13 of the drum 1 is formed with a ring 14 of ratchet teeth capable of engagement by a pawl 15 pivoted at 16 within the housing 10.

The pawl 15 is controlled by a pendulum 20 comprising a bob weight 21 mounted at the lower end of a rod 22 suspended at 23 by a universal joint which allows the pendulum to swing in any direction. Swinging movement of the pendulum 20 is damped by a volume of hydraulic fluid 24 contained within a chamber 25 and, in the position shown in full lines in the drawing, the weight 21 has swung over to an extreme position at which it is in contact with the left-hand wall of the chamber 25. To reduce the shock of impact of the weight 21 against the wall of the chamber 25, it is fitted with a ring 28 of resilient material which is shown in contact with the wall of the chamber and is capable of yielding in relation to the rod 22, being held in position between a pair of nuts 29 at the bottom of the rod 22 and a coiled compression spring 30. The upper end 32 of the rod 22 is connected by a ball joint 33 to a short link 34 which is connected at its upper end by a second ball joint 35 to a lever arm 36 turning about a fixed fulcrum 37 at its left-hand end. The right-hand end of the lever 36 is pivoted at 39 to a link 40 which is pivoted at its further end 41 to a rocker 42 pivoted at 43 and connected by a short link 44 to the pawl 15.

The parts 34, 36, 40, 42 and 44 together constitute a linkage by means of which movements of the pendulum 20 control the pawl 15, moving it into and out of engagement with the ring of ratchet teeth 14. In the full-line position shown, the pawl 15 is in engagement with the ratchet teeth 14, but when the device as a whole is horizontal and the pendulum rod 22 is consequently vertical, as shown in dotted lines, its upper end 32 rises, thus turning the lever arm 36 in an anticlockwise direction and withdrawing the pawl 15 from the ratchet teeth 14. Under these conditions, the drum 1 is free to turn, but as soon as the pendulum 20 swings through a predetermined angle, the pawl 15 is moved to lock the drum 1. To allow for the possibility that the pawl 15 might be moved into engagement with the top of one of the ratchet teeth 14, the link 40 includes a compression spring 46 which thus avoids damage to the linkage as a whole and causes the pawl 15 to be forced into position between adjacent teeth as soon as the drum 1 has turned sufficiently far to allow this.

On the basis of the arrangement so far described, the strop 2 can be withdrawn and retracted under the control of the spring 5 as long as the device as a whole is substantially horizontal. The control force exerted by the spring 5 is sufficient to hold in position any object attached to the outer end of the strop 2, but nevertheless enables the object to be moved when required by the application of a force greater than the restraining force of the spring. On the other hand, as soon as the device as a whole tilts beyond a predetermined angle, the drum 1 and hence the strop 2 is automatically locked. Under some circumstances, it may be desirable to lock the drum 1 even when the device is horizontal, and for this purpose a second pawl 50 is provided which is pivoted at 51 and is controlled by a link 52 pivoted to the pawl at 53 and to the base of the housing 10 at 54. This link 52 is controlled by means of a further link 55 connected to the plunger 56 of a solenoid 57. The circuit to the solenoid 57 is manually controlled from any convenient point and enables the drum 1 to be locked under manual control when required.

To allow for changing angles of the strop 2 in the horizontal plane, the device as a whole needs to be able to turn in this plane. The device is shown as supported on a deck 60 shown in dotted lines, being secured to a strong point constituted by an eye 61 located in a recess 62. The device is secured to the strong point 61 by means of a hooked connection 64 having a stem which passes up through the centre of a vertical pillar 66. The stem is threaded at the top and a knob 65, which bears against a thrust bearing 72, is screwed on to the threaded portion so as to draw the connection 64 upwardly into firm engagement with the eye 61. The vertical pillar 66 is formed at the bottom with a foot portion 70 resting on the deck 60. The device as a whole is supported by the pillar 66 by way of a thrust bearing 68 which enables the device as a whole to turn about the pillar 66 and its foot portion 70.

When used for securing an aircraft in position on the deck of a ship, four devices as just described are preferably used, the four strops 2 being secured to fixing points on the aircraft in an X formation. With such an arrangement, the aircraft can be manoeuvred without difficulty as long as the deck is horizontal, the respective strops yielding and being taken up automatically under the control of their spring-loaded drums. If, under these conditions, it is desired to lock the aircraft in position, all four of the solenoids 57 can be energised simultaneously by a single manual control so that all four strops are locked. As soon as the deck tilts beyond the predetermined angle for which the restraining devices are designed, the pawls 15 automatically come into engagement and the aircraft is held firmly in position until the deck again becomes horizontal.

I claim:

1. In a restraining device of the type comprising a drum, means mounting said drum for rotation, a strop-like flexible member wound on said drum, spring means connected to turn said drum in a direction to wind up said flexible member and a ratchet control mechanism, said mechanism including a ratchet wheel turning with said drum, a pawl cooperating with said ratchet wheel, a hydraulically damped pendulum and means connecting said pendulum to said pawl whereby said pawl is moved into engagement with said ratchet wheel when said pendulum swings through more than a predetermined angle, the improvement which comprises a second pawl for locking said drum and manually controlled means for operating said pawl.

2. A restraining device according to claim 1, in which said manually controlled means is a solenoid.

3. A restraining device according to claim 1 and including a connection for anchoring said device to a strong point in the deck of a craft.

4. A restraining device according to claim 3 and including a vertical pillar for supporting said device and means mounting said device for rotation around said pillar, said connection being formed at the foot of said pillar.

* * * * *